United States Patent Office 3,320,194
Patented May 16, 1967

3,320,194
CURING EPOXIDIZED RESINS AND PHE-
NOLIC ESTER MODIFYING COMPOSI-
TIONS THEREFOR
Arthur C. Hecker, Forest Hills, N.Y., Mark W. Pollock,
Teaneck, N.J., and Donald Bachrach, Brooklyn, N.Y.,
assignors to Argus Chemical Corporation, a corporation
of Delaware
No Drawing. Filed Feb. 17, 1966, Ser. No. 528,053
17 Claims. (Cl. 260—18)

This is a continuation-in-part of application Ser. No. 104,852 filed Apr. 24, 1961, now abandoned.

This invention relates to a process of curing liquid polyepoxide resins, and to the resins obtained by this process, and to a curing combination including a phenolic ester that is capable of rapidly curing such resins to a homogeneous resin of good color.

Epoxy resins have received a wide acceptance since their development in the manufacture of protective surface coatings, varnishes, enamels, molding compositions, adhesives, films, fibers, and molded articles. These resins can be prepared in the form of partially polymerized liquids which are easily brought to the desired solid finished resin by the addition of a curing agent which is reactive with the free epoxy groups of the initial polymer. The curing agent thus enters the molecule of the final resin, and in this respect differs from the curing catalysts which are employed with other types of synthetic resins. It must for this reason be employed in stoichiometric proportions, and rather large amounts, as compared to catalytic amounts, are required.

A wide variety of curing agents have been proposed. Bender, Farnham and Guyer, Patent No. 2,506,486, suggest alkaline-reacting salts and basic nitrogen compounds such as the organic amines and quaternary ammonium compounds. Bradley No. 2,541,027, suggests acidic organic orthophosphates. Shokal No. 2,633,458, to these, added sodium hydrosulfide and heterocyclic amines. Dannenberg No. 2,643,243 employed sulfonic acid or sulfonyl halides. Anhydrides also have been suggested. Shokal No. 2,768,153 pointed out the unsatisfactory slow reaction that anhydrides give, and proposed that they be used with an activator such as a phosphine, arsine, stibine or bismuthine.

In accordance with the instant invention it has now been determined that the curing of polyepoxide resins can be considerably enhanced by the use of a carboxylic acid ester of a phenol. The phenol ester modifies the curing action of polyepoxide curing agents, and may itself enhance this curing action, particularly in the case of polyvalent metal salts. In the presence of an insufficient amount of the curing agent to effect a cure, the phenol ester may itself act as a curing agent, and together therewith effect a better cure than the curing agent alone. However, the phenol ester alone is not a curing agent. These phenol esters, particularly the non-polymeric esters, may modify the initial viscosity of the resin before curing, facilitate blending solid curing agents with the resin, slow the rate of curing imparted by fast curing agents, such as the amines, and modify the physical properties of the cured resin over a wide range of flexibility, impact strength and hardness. The phenol ester is in general compatible with the epoxy resin in amounts as high as 200 parts or more per 100 parts of resin, and gives homogeneous cured resins. Where the compatibility of the curing agents with the resin is not too good, the phenol ester may improve this compatibility. The phenol ester may also act as a curing agent in the absence of another curing agent and in the presence of an accelerator, such as a metal salt. Thus, the improvement due to the phenol ester is evidenced in many directions.

The composition of curing agent and phenol ester constitutes one embodiment of the invention. This can be made up as a mixture or solution in the proper proportions to effect the desired cure or set, while imparting the desired reduction in viscosity of the resin during curing, and the desired degree of flexibility and impact strength to the cured resin.

The composition of partially polymerized epoxy resin and phenol ester constitutes another embodiment of the invention. The phenol ester is not a curing agent, although it may react with the resin in the presence of a curing agent, and can be added to the resin in the amount desired for viscosity modification, flexibility and impact strength, as stated above. The composition is stable, and cures when a curing agent is added in the desired amount.

The phenol ester in accordance with the invention is an ester of a phenol having at least one phenolic hydroxyl group and from one to about thirty carbon atoms per phenolic hydroxyl group and of an organic carboxylic acid having from one to about twenty-four carbon atoms per carboxylic acid group —COO—.

The phenol contains one or more phenolic hydroxyl groups, and may contain one or more phenolic nuclei. In addition, the phenolic nucleus may have an oxy or thio ether substituent.

The substituted phenols and polynuclear phenols because of their molecular weight have a higher boiling point, and therefore may be advantageous where low volatility is desirable. There can be one or a plurality of alkyl, aryl and cycloalkyl substituent groups of one or more carbon atoms.

Usually, from the standpoint of availability, the phenols will not have more than about eighteen carbon atoms in any alkyl, aryl, cycloalkyl, alicyclidene and alkylene group, and a total of not over about fifty carbon atoms. The phenols may have from one to five substituent radicals per phenol nucleus.

The polycyclic phenols contain at least one phenolic hydroxyl group, and the rings can be linked by thio or oxy ether groups, or by alkylene, alicyclidene or arylidene groups. Such phenols can be defined by the formula:

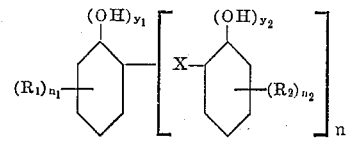

where X is an oxygen or sulfur atom, or an alkylene or alicyclidene or arylene or a mixed alkylene-alicyclidene or alkylene-arylidene group, having a straight or branched chain, whose total number of carbon atoms ranges from one to about eighteen, $y_1$ and $y_2$ are the number of phenolic hydroxyl groups OH, and can be zero or an integer, $n_1$ and $n_2$ are the number of R groups, $m$ is the number of phenolic units enclosed by the brackets, and is one or more. In the case of nonpolymeric phenols, $m$ is from one to about five, and in the polymeric phenols $m$ usually is not more than 500, and $R_1$ and $R_2$ are hydrogen, alkyl, aryl or cycloalkyl groups of from one to about eighteen carbon atoms. Preferably, the OH groups are ortho and/or para to X.

The sum of $y$ and $n$ in each ring cannot, of course, exceed five, when $m$ is one, and the sum of $y_2$ and $n_2$ cannot exceed four in the intermediate rings when $m$ is more than one.

Typical X groups are

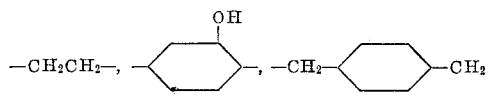

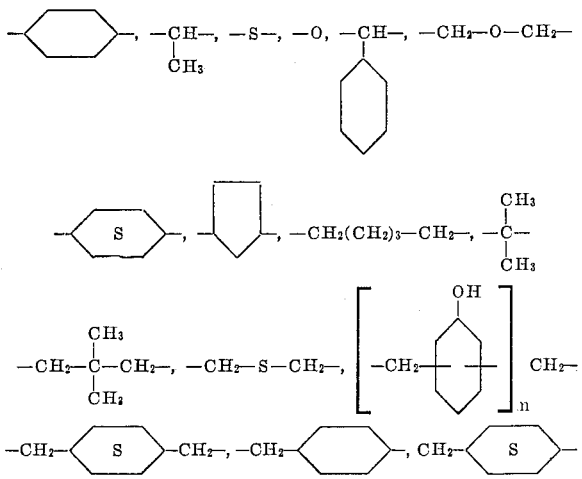

The various X and R groups are exemplified in the following compounds.

Exemplary of monohydric phenols are phenol, o-, m-, and p-cresol, o-, m-, and p-phenylphenol, the o-, m-, and p-xyleneols and carvenols, thymol, o-, m-, and p-nonyl phenol, o-, m-, and p-dodecyl phenol and o-, m-, and p-octyl phenol.

Exemplary of polyhydric phenols are orcinol, phloroglucinol, catechol, resorcinol, p-octyl resorcinol, p-dodecyl resorcinol, hydroquinone, p-octadecyl catechol, p-isooctyl-phloroglucinol, pyrogallol, hexahydroxy benzene, p-isohexyl-catechol, 2,6-ditertiary butyl resorcinol, 2,6-diisopropyl phloroglucinol, methylenebis-(2,6-ditertiary butyl phenol), 2,2-bis(4-hydroxyphenyl)propane, methylenebis-(p-cresol), 4,4'-thio-bisphenol, 4,4'-oxobis(3-methyl-6-isopropyl phenol), 2,2'-oxobis-(4-dodecyl phenol), 2,2'-thiobis(4-methyl-6-tertiary butyl phenol), 2,6-diisooctyl resorcinol, 4,4'-n-butylidenebis-(2-t-butyl 5-methyl-phenol), 4,4'-benzylidenebis(2-t-butyl-5-methyl-phenol), 2,2'methylenebis-(4-methyl-6-1'-methylcyclohexyl-phenol), 4,4'-cyclohexylidenebis-(2-t-butyl-phenol), 2,6-bis(2'-hydroxy-3't-butyl-5'-methylbenzyl)-4-methylphenol, 4-octyl pyrogallol, and 3,5-ditertiary butyl catechol.

Any organic mono and polycarboxylic acid can be used as the acid component of the phenol ester, for instance, aliphatic acids, aromatic acids, cycloaliphatic acids and heterocyclic acids.

A preferred class of such acids are the aliphatic fatty acids having from two to twenty-four carbon atoms and one carboxylic acid group, for example, acetic acid, propionic acid, butyric acid, hexoic acid, stearic acid, lauric acid, octoic acid, 2-ethyl hexoic acid, myristic acid, palmitic acid, oleoic acid, linoleic acid and ricinoleic acid. Mixtures of fatty acids as derived from hydrolysis of naturally-occuring fatty oils can be employed. Representative aromatic acids are the benzoic and naphthoic acids and alkyl-substituted benzoic and naphthoic acids, for example, methyl benzoic acid, tertiary octyl benzoic acid, and methyl naphthoic acid. The napthenic acids are exemplary of the cycloaliphatic acids. Furoric acid is an example of a heterocyclic acid.

Polycarboxylic acids also can be employed. Exemplary are malic acid, maleic acid, fumaric acid, glutaric acid, adipic acid, succinic acid, phthalic acid, isophthalic acid, terephthalic acid, oxalic acid, citric acid and tartaric acid and dimerized and trimerized unsaturated fatty acids such as linoleic acid and linolenic acid.

Esters of polycarboxylic acids and polyhydric phenols and esters of monocarboxylic acids and polymeric phenols are polymeric. Esters of dicarboxylic acids and dihydric phenols form linear polymers, and esters including a tri or higher polyfunctional acid or phenol form three-dimensional polymers. Liquid polyesters of these types are in a special category, because of their polymeric nature, and are employed where their special properties as polymers are advantageous.

The phenol esters employed in accordance with the invention may be prepared by reaction of the corresponding phenol and acid, acid halide, acid anhydride or an ester of the acid, if desired with the aid of the catalyst. These reactions are conventional. The reaction mixtures may contain free phenol, free acid, or both; the presence of such components in amounts compatible with the polyepoxide in no way detracts from the effectiveness of the phenol ester in the invention, and in certain circumstances may even be advantageous.

The curing agent employed in the compositions of the invention can be any of those well known to those skilled in the art as useful in the curing of polyepoxides. The curing agent can be a liquid or solid compatible with the polyepoxide composition or with the phenol ester.

The polyvalent metal salts constitute one class of satisfactory curing agents. These are bi- or higher polyvalent metal salts of any polyvalent metal, for example, zinc, aluminum, iron, manganese, cobalt, lead, cadmium, tin, barium, chromium and copper and any organic acid. The organic acid can be any of those acids named heretofore in defining the phenol ester which in the polyvalent metal salt form is compatible with the cured resin.

The curing action of the polyvalent metal salts is considerably enhanced by the phenol esters of the invention, and in fact the phenol ester will itself act as a curing agent in the presence of an amount of the polyvalent metal salt insufficient to effect a cure. Furthermore, the phenol ester and polyvalent metal salts together enhance the cure effected by other curing agents, such as the anhydrides.

Also useful in place of the acids in forming such polyvalent metal salts are the organic phenols, such as phenol, cresol, resorcinol, dibutyl phenol, t-octyl phenol and nonyl phenol. These form phenolates with the polyvalent metal. Salts with polyvalent metals of organic sulfonic, sulfinic and sulfuric acids and of phosphonic, phosphoric and phosphinic acids can be employed, also.

Useful as curing assistants in conjunction with polyvalent metal salts are organic phosphites having the general formula:

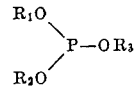

in which the R radicals are selected from the group consisting of saturated and unsaturated substituted and unsubstituted aliphatic, aromatic, heterocyclic and cycloaliphatic radicals having up to about eighteen carbon atoms. Typical aliphatic radicals are methyl, ethyl, propyl, butyl, isobutyl, secondary butyl, 2-ethylhexyl, tertiary butyl, hexyl, octyl, dodecyl, octadecyl, octadecenyl, propenyl, and hexenyl. Aromatic radicals include phenyl, naphthyl, benzyl, isooctyl phenyl, octyl phenyl, methyl phenyl, methyl naphthyl, 1,3-dimethyl phenyl, nonyl phenyl, and butyl phenyl. Among the cycloaliphatic radicals are cyclopentyl and cyclohexyl. Heterocyclic radicals include furfuryl and tetrahydrofurfuryl.

Exemplary phosphites are triphenyl phosphite, tribenzyl phosphite, isooctyl diphenyl phosphite, di-2-ethylhexyl phenyl phosphite, diphenyl 2-ethylhexyl phosphite, tri-n-butyl phosphite, tridodecyl phosphite, 2-ethylhexyl di(isooctylphenyl) phosphite, tri(isooctylphenyl) phosphite, n-hexyl diphenyl phosphite, trinaphthyl phosphite, octadecyl butyl phenyl phosphite, phenyl cyclopentyl isooctyl phosphite, octadecenyl diphenyl phosphite, hexenyl diphenyl phosphite, di(decyl)phenyl phosphite, and tritetrahydrofurfuryl phosphite.

When both a phosphite and a polyvalent metal salt are used in combination, no additional curing agent is necessary. The phosphite can assume this function. However, one can be employed if desired.

Organic amines form another well known class of curing agents. Amines give a fast cure, and the phenol esters of the invention improve blending of the amine with the resin by modifying the viscosity of initial mix. Aliphatic amines such as dimethylamine, trimethylamine, triethylamine, 1,3-diaminopropane, hexamethylene diamine, diethylene triamine, triethylene tetramine, octylamine, decylamine, dioctylamine, and dodecylamine are exemplary of primary, secondary and tertiary aliphatic amines. The aliphatic amines preferably have from one to twelve carbon atoms. Also useful are the aromatic amines such as phenylene diamine, di(methylaminomethyl)phenol, tri(dimethylaminomethyl)phenol, and diethylaniline.

The acid anhydrides constitute a particularly useful class of curing agents. These compounds are derived from mono or preferably, polycarboxylic acids, and possess at least one anhydride group:

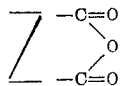

Z represents the carboxylic acid residue, and may be a saturated or unsaturated aliphatic, cycloaliphatic, aromatic or heterocyclic group. Exemplary are phthalic anhydride, maleic anhydride, "Nadic" methyl anhydride, succinic anhydride, chlorosuccinic anhydride, 6-ethyl-4-cyclohexadiene-1,2-dicarboxylic acid anhydride, dodecenyl succinic acid anhydride, tetrahydrophthalic acid anhydride, pyromellitic dianhydride, and the like. Other anhydrides which can be used will be found mentioned in U.S. Patent No. 2,768,153. Anhydrides normally are used with a catalyst, such as a tertiary amine or a heavy metal salt of an organic carboxylic acid, as named above.

Also useful are the organic aliphatic, aromatic, cycloaliphatic and heterocyclic mono and polycarboxylic acids, for example, adipic, sebacic, succinic, glutaric, phthalic, oleic, benzoic, t-butyl benzoic, naphthenic, dimerized linoleic acids, and tall oil fatty acids.

The organic acid phosphates are also useful curing agents. The organic acid phosphates have the general formula:

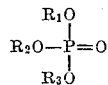

wherein one to two R's are hydrogen and the remaining R's are alkyl or aryl radicals having from one to eighteen carbon atoms. Any alkyl or aryl group may be used in including methyl, ethyl, butyl, amyl, 2-ethyl-hexyl, lauryl, stearyl, etc.

Organic sulfonic acids and sulfonyl halides can also be employed as curing agents. These have a sulfonic acid or a sulfonyl halide group or groups linked to an aliphatic, aromatic or alicyclic hydrocarbon radical, including for example, the aliphatic monosulfonic acids, such as methane sulfonic acid, ethane sulfonic acid, butane sulfonic acid, dodecane-1-sulfonic acid and propane sulfonic acid; the aliphatic polysulfonic acids such as methane disulfonic acid, ethane-1,1-disulfonic acid, 2-methylpropane - 1,2-disulfonic acid, ethane-1,1,2 - trisulfonic acid and methane trisulfonic acids; the aromatic mono- and polysulfonic acids, such as benzene sulfonic acid, o-toluene sulfonic acid, 2,4-dimethyl benzene sulfonic acid, 2,4,5-trimethyl benzene sulfonic acid, phenyl ethane sulfonic acid, mesitylene sulfonic acid, m-cymene sulfonic acid, p-benzene sulfonic acid, benzene-1,3,5-trisulfonic acid, and toluene-2,4-disulfonic acid, as well as the alicyclic mono- and polysulfonic acids such as cyclopentane sulfonic acid and cyclohexane sulfonic acid. The corresponding sulfonyl halides include methane sulfonyl chloride, ethane sulfonyl chloride, butane-1-sulfonyl bromide, ethane 1,2-disulfonyl chloride, benzene sulfonyl chloride, benzene sulfonyl bromide, naphthalene-2-sulfonyl chloride, and cyclohexane sulfonyl chloride.

Liquid organic polysulfides are additional useful curing agents, i.e., produced by the reaction of dichlorodiethyl formal and an alkali polysulfide. These are liquid polymers which are available under the trade name "Thiokols." Typical are Thiokol LP-2, LP-32, LP-3, LP-33 and LP-8.

Another class of useful curing agents are the liquid polyamide resins produced by the condensation of polycarboxylic acids with polyamines. The dicarboxylic acids and diamines give linear polymers, and are preferred. Typical of the acids are adipic acid, succinic acid, azelaic acid, and glutaric acid which are condensed with polyamines such as hexamethylene diamine and octamethylene diamine. Polymers produced using mixtures of carboxylic acids and amines as well as amino acids such as ε-caprolactam or ε-amino-caproic acid are particularly desirable. Condensation products of diamine and dimeric unsaturated fatty acids are available commercially under the trademark "Versamid," for example, Versamid 100, 115 and 125.

The invention is applicable to the curing of any polyepoxides, otherwise known as epoxy resins, which are well-known to the art. The epoxy resins contain at least two reactive epoxy groups

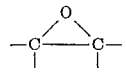

in their molecule. The epoxy groups can be contained in any type of organic compound having a saturated or unsaturated aliphatic, cycloaliphatic, aromatic or heterocyclic structure, and these compounds may bear substituents which are inert to the epoxide unit, such as chlorine atoms, or ether radicals. The polyepoxides may be monometic or polymeric.

The polyepoxide should have an epoxy equivalency greater than one. This is a term widely recognized in this art, and is defined in U.S. Patent No. 2,633,458 to Shokal patented Mar. 31, 1953. Single monomeric polyepoxides have their epoxide groups intact, and their epoxy equivalency is in whole integers representing the number of epoxy units per molecule. Polymeric materials have some of the epoxy groups reacted, and contain macromolecules of somewhat different molecular weight, so that the epoxy equivalent values may range above or below 2, and have decimal values, such as 1, 5, 1.8, 2.5 and the like.

Exemplary of the polyepoxides to which the invention is applicable are 1,4-bis(2,3-epoxy propoxy) benzene, 4,4'-bis(2,3-epoxy propoxy) diphenyl ether, 1,8-bis(2,3-epoxy propoxy) octane, 2,3,5,6-diepoxyoctane, 2,3,6,7-diepoxydodecane, 1,4-bis(2,3-epoxy propoxy) cyclohexane, 2,2-bis(epoxy cyclohexyl) propane, 1,2-epoxy-4-(3,4-epoxybutyl) cyclohexane and 1,3-bis(4,5-epoxy pentoxy)-5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2-bis-(4-hydroxy phenyl) propane (bis-phenol A), 2,2-bis(4-hydroxy phenyl) butane, 4,4'-dihydroxy-benzophenone and 1,5-dihydroxy naphthalene with halogen-containing epoxides such as 3-chloro-1,2-epoxy butane, 3-chloro-1,2-epoxy octane, 3-chloro-1,2-epoxy octane, and epichlorhydrin, the epoxidized esters of the polyethylenically unsaturated monocarboxylic acids, such as epoxidized linseed, soybean, and dehydrated castor oil, monoglycerides of tung oil fatty acids, monoglycerides of soybean oil, sunflower, rapeseed, hempseed, sardine, cottonseed oil and epoxidized triglycerides such as epoxidized glycerol trioleate, the epoxidized esters of unsaturated monohydric alcohols and polycarboxylic acids, such as, for example, di(2,3-epoxybutyl) adipate, di(2,3-epoxy-butyl) oxalate, di(2,3-epoxyhexyl) succinate, di(3,4-epoxybutyl) maleate, di(2,3-epoxyoctyl)pimelate, di(2,3-epoxybutyl) phthalate, di(2,3-epoxyoctyl) tetrahydrophthalate, epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxy-6-methyl cyclohexyl methyl-3,4-epoxy-6-methyl cyclohexane carboxylate, epoxidized tetrahydrobenzyl tetrahydrobenzoate, 3,4-epoxycyclohexyl 3,4-cyclohexanoate, 3,4-epoxycyclohexyl 4,5-epoxyoctanoate, epoxidized derivatives of polyethylenically unsaturated polycarboxylic acids, such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11-diepoxyhexadecanedioate, the epoxidized polyesters obtained by reacting an unsaturated polyhydric alcohol and/ or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid, the epoxidized polymers and copolymers of diolefins, such as butadiene, butadiene-acrylonitrile copolymers (Hycar rubbers), butadiene styrene copolymers.

The polyepoxides are readily prepared in accordance with the teachings of the art by reacting the desired proportions of the alcohol or phenol and the halohydrin in an alkaline medium such as sodium or potassium hydroxide, preferably in stoichiometric excess to the halohydrin. The reaction is preferably accomplished at temperatures within the range from 50 to 150° C., and after several hours reaction, the product is washed free of salt and base.

The polyepoxides polymerized in accordance with the invention can, of course, have their epoxy units at any point of the molecule, and the invention is not limited to those wherein the epoxy unit is at the end of a chain, although this is probably the most frequently-occurring type of molecule. The above group includes not only the 1,2-epoxycompounds but also the 2,3-, 3,4-, and 4,5-epoxy compounds, and further variations will, of course, be apparent.

As an example, the monomeric products produced from alcohols or phenols and epichlorhydrin may be represented by the general formula:

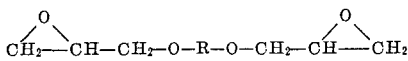

wherein R represents the divalent residue of the alcohol or phenol. The polymeric products will contain not a single simple molecule but a complex mixture of polyethers having the general formula:

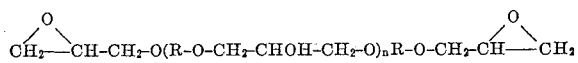

wherein R is as before, and $n$ is an integer which corresponds to the length of the chain. The polyether is a mixture of compounds having varying values of $n$, whence derives the fractional values for the epoxy equivalency referred to above.

In accordance with the process of the invention, the polyepoxide is cured by admixing with the curing agent, curing assistant, if any, and phenol ester and then allowing it to polymerize to a hard, solid polymer. The amount of the curing agent can be widely varied, and will depend upon the rate of cure desired, and the hardness of the final polymer. The agent actually reacts with the polyepoxide, and therefore the agent should be employed in at least a stoichiometrically equivalent amount, which depends upon the epoxy value of the polyepoxide. However, good cures are obtained by reacting the polyepoxide with as little as 0.2 equivalent of the curing agent. Preferably, it is used in a ratio of from 1 to 1.5 per epoxy value unit in the resin.

The curing assistant, that is, the phosphite used with the polyvalent metal salt, is needed in only very small amounts, but since it also reacts with the polyepoxide it can be used in relatively large amounts if desired. Less of the polyvalent metal salt is required than phosphite. Excellent results are obtained when the polyvalent metal salt is present in an amount ranging from 0.5 to 10%, and when the phosphite is present in an amount ranging from 5% to 125% by weight of the resin. At large amounts, the hardness of the resin may be diminished. The maximum amount that can be used is determined by the curing conditions and physical properties desired.

The phenol ester is added in an amount to impart the desired modification to the cure, including change in viscosity of the resin, mix, and in rate of cure, and to impart the desired flexibility, hardness and impact resistance to the cured resin. These phenol esters are in general compatible with epoxy resins in amounts of 200 parts per 100 parts of resin and higher, at which levels very soft and even liquid resins are obtainable. Using lesser amounts, solid resins of a wide range of flexibility, hardness and impact strength are obtained. Usually, an amount within the range of 5% to 100% by weight of the resin is satisfactory.

The curing agent and phenol ester can be combined together before being added to the polyepoxide, or they can be added separately.

To facilitate mixing with the curing agent, it is desirable to have the polyepoxide in a fluid condition. The phenol ester of the invention can serve to reduce viscosity to a convenient level, and will make heating unnecessary, thus avoiding premature cure. A liquid solvent can be added also, if desired. Normally solid polyepoxides are either melted or dissolved in the phenol ester and/or in a suitable solvent. Such solvents are well known. Any of the solvents mentioned in U.S. Patent No. 2,768,153 to Shokal, patented Oct. 23, 1956, can be employed.

In many cases it is convenient to employ a combination of a solid or semisolid polyepoxide and a liquid polyepoxide such as a normally liquid glycidyl polyether of a polyhydric alcohol.

The polyepoxide composition can if desired include other ingredients, such as pigments, fillers, dyes, plasticizers, other resins and the like.

The curing temperature is not critical and will depend upon the resin and curing combination. Some phenol ester combinations are active at room temperature, i.e. temperatures of from 15 to 35° C., and the cure may be effected at these temperatures by merely mixing the combination with the polyepoxide and letting the mixture stand. A more rapid cure can be effected by increasing the temperature.

Ordinarily, the temperature of curing will be selected so as to enable a complete cure within about one hour's time. Moderate to fast rates of cure are obtainable at temperatures of from 50 to 110° C., and very fast rates of cure are obtained at temperatures of from 150 to 200° C. Temperatures above 200° C. ordinarily are not required, but can be employed if desired. The higher the temperature, the more rapid the cure.

The following examples in the opinion of the inventors represent the bast embodiments of their invention.

*Examples 1 to 3*

A glycidyl polyether type of polyepoxide resin was prepared as follows: about 2 moles of 2,2-bis(4-hydroxy phenyl) propane was dissolved in 10 moles of epichlorhydrin and 1 to 2% water added. The mixture was then brought to 80° C. and 4 moles of solid sodium hydroxide added in small portions over a period of about one hour. During the addition the temperature of the mixture was held at about 90 to 110° C. After the sodium hydroxide had been added the water formed in the reaction and most of the epichlorhydrin was distilled off. The residue that remained was combined with an approximately equal quantity by weight of benzene, and the mixture filtered to remove the salt. The benzene was then removed, leaving a viscous liquid having an epoxy value equivalent of 1.75 (0.5 per 100 grams).

The expoxidized bisphenol so produced was mixed in the proportion of 100 parts with the amount of diethylene triamine and phenol ester noted in Table I. These compositions were allowed to cure at room temperature. The time required before the resin became tack-free, and the characteristics of the cured resin, were then noted, and are reported in Table I.

TABLE I

| Example No. | 1 | 2 | 3 |
|---|---|---|---|
| Epoxy resin | 100 | 100 | 100. |
| Diethylene triamine | 11.5 | 11.5 | 11.5. |
| Phenyl oleate | 50 | | |
| Nonyl phenyl benzoate | | 50 | |
| Diphenyl phthalate | | | 50. |
| Room Temperature Curing: | | | |
| Time to become tack-free | 30–35 min | Over ½ hour | 1 hour. |
| Condition of surface | Dry | Dry | Dry. |
| Hardness after 24 hours [1] at room temperature | D45–61 / D47–62 | D78–81 / D80–84 | B21–26.[2] |
| Compatibility when cured 15 min. at 250° F | Comp | Comp | Comp. |
| Condition of surface when cured 15 min. as 250s F | Dry | Dry | Dry. |
| Impact Strength after 1 week at room temperature | 2.8 ft.-lbs | 9.35 ft.-lbs | 2.8 ft.-lbs. |

[1] D = Shore D.
[2] B = Barcol Hardness.

*Examples 4 to 9*

Compatible cured compositions of varying hardness can be prepared, depending on the proportions of phenol ester and curing agent. This is shown by the following data, obtained on a second set of compositions containing 100 grams of the epoxidized resin of Examples 1 to 3, the amount of diethylene triamine, and the amount of phenol ester noted in Table II. The effect of the phenol ester on the properties of the mix is shown in the data. The hardness values are on the Barcol scale (B values) and on the Shore Durometer D scale (D values).

*Examples 10 to 12*

A group of compositions was prepared using the epoxy resin of Examples 1 to 3 and an anhydride curing agent, "Nadic" methyl anhydride. These compositions contained 2.5 grams of zinc 2-ethyl hexoate and 2.5 grams of isooctyl diphenyl phosphite as accelerators for the anhydride. The phenol esters were in the amounts listed in Table III. All compositions were cured at 150° C. for one hour. Compatible cured resins were obtained, with varying physical properties, depending upon the amount of phenol ester.

TABLE III

| | Control | Example No. | | |
|---|---|---|---|---|
| | | 10 | 11 | 12 |
| Epoxy Resin | 100 | 100 | 100 | 100 |
| "Nadic" methyl anhydride | 84 | 84 | 84 | 108 |
| Phenyl tallate | | 50 | 100 | 50 |
| Zinc 2-ethyl hexoate | 2.5 | 2.5 | 2.5 | 2.5 |
| Isooctyl diphenyl phosphite | 2.5 | 2.5 | 2.5 | 2.5 |
| Condition of Surface | ([1]) | ([1]) | ([1]) | ([1]) |
| Hardness | [2] B30–35 | [3] D72–76 | [3] D50–56 | [3] D68–73 |
| Impact Strength (ft. lbs.) | >14.18 | 5.7 | 6.2 | 7.5 |

[1] Dry.
[2] B = Barcol Hardness at 25° C.
[3] D = Shore D Hardness at 25° C.

TABLE II

| | Control | Example No. | | |
|---|---|---|---|---|
| | | 4 | 5 | 6 |
| Epoxy resin | 100 | 100 | 100 | 100. |
| Diethylenic triamine | 11.0 | 11 | 13 | 15. |
| Phenyl tallate | | 50 | 50 | 50. |
| Results: | | | | |
| Time to become tack-free at room temperature | 34 min | 2 hr., 51 min.[1] | 34 min | 26 min. |
| Hardness after 20 hours at room temp | B27–38 | D20–45 | D57–66 | D70–75. |
| Hardness after 5 days at room temp | B27–37 | | | |
| Hardness after 1 hr. cure at 250° F | | D55–65 / D65–70 | D69–73 / D70–75 | D70–75. / D72–78. |
| Flexibility 20 mil slab cured 24 hrs. at room temp. and 1 hr. at 250° F. | | Cracks on 170° Bend | | |
| Impact Strength after 1 hr. at 250° F | | | 2.9 ft.-lbs | 2.7 ft.-lbs. |

| | Example No. | | |
|---|---|---|---|
| | 7 | 8 | 9 |
| Epoxy resin | 100 | 100 | 100. |
| Diethylene triamine | 11 | 14 | 17. |
| Phenyl tallate | 100 | 100 | 100. |
| Results: | | | |
| Hardness after 2 days at room temp | D0–1 / D0–1 | D8–20 / D8–17 | D24–42. / D24–41. |
| Hardness after 1 week at room temp | D1–D3 / D0–D2 | D11–25 / D10–22 | D23–42. / D23–47. |
| Hardness after 2 days at room temp. and 24 hrs. at 150° F. and 24 hrs. at 250° F | D2–9 / D2–8 | D17–41 / D17–41 | D55–65. / D50–62. |
| Percent Weight Loss after 2 days at room temp. on postcure and 24 hr. at 150° F. and 24 hrs. at 250° F. | 3.47% | 5.36% | 7.07.% |
| Percent Weight Loss after 2 days at room temp. on 24 hr. postcure at 150° F. | 1.09% | 1.12% | 1.07%. |
| Hardness | D2–6 / D2–5 | D15–30 / D16–30 | D25–43. / D16–47. |

[1] Slightly tacky.

Examples 13 to 23

A group of curing agent-phenol ester compositions was prepared, using an anhydride curing agent, "Nadic" methyl anhydride, and various phenol esters in the amounts listed in Tables IV and V. Some of these compositions contained 2.5 parts of zinc 2-ethyl hexoate and 2.5 parts of isooctyl diphenyl phosphite.

These compositions were stable, and when added to 100 parts of the epoxy resin of Examples 1 to 3 effected a cure to a solid compatible resin having a hardness corresponding to the amount of curing agent and phenol ester added, and a good impact strength.

TABLE IV

| Example No. | 13 | 14 | 15 | 16 | 17 | 18 | 19 | 20 | 21 | 22 | 23 |
|---|---|---|---|---|---|---|---|---|---|---|---|
| "Nadic" methyl anhydride | 84 | 132 | 84 | 84 | 84 | 132 | 84 | 84 | 108 | 84 | 108 |
| Phenyl tallate | 50 | 100 | | | | | 100 | | | | 50 |
| Nonyl phenyl benzoate | | | 50 | | | | | | | 50 | |
| Bisphenol A tallate | | | | 100 | | | | | | | |
| Diphenyl phthalate | | | | | 50 | | | | | | |
| Phenyl oleate | | | | | | | | 50 | | | |
| Zinc 2-ethyl hexoate | | | | 2.5 | 2.5 | 2.5 | 2.5 | 2.5 | 2.5 | 2.5 | 2.5 |
| Isooctyl diphenyl phosphite | | | | 2.5 | 2.5 | 2.5 | 2.5 | 2.5 | 2.5 | 2.5 | 2.5 |

Examples 24 to 28

A group of curing agent-phenol ester compositions were prepared, using an anhydride curing agent, an amine curing catalyst, and various phenol esters, in the amounts listed in Table V.

These compositions when added to 100 parts of the epoxy resin of Examples 1 to 3 effected a cure to a solid compatible resin having a hardness corresponding to the amount of curing agent and phenol ester added, and a good impact strength.

TABLE V

| Example No. | 24 | 25 | 26 | 27 | 28 |
|---|---|---|---|---|---|
| Phthalic anhydride | 75 | | 75 | | |
| Dodecenyl succinic anhydride | | 132 | | | |
| "Nadic" methyl anhydride | | | | 84 | 84 |
| Phenyl tallate | 50 | | | | |
| Nonyl phenyl benzoate | | | 50 | | |
| Bisphenol A tallate | | | | 50 | |
| Diphenyl phthalate | | 50 | | | |
| Phenyl oleate | | | | | 50 |
| Benzyl dimethylamine | 2 | 5 | 2 | | |
| Diethyl aniline | | | | 5 | 5 |

Examples 29 and 30

Several epoxy resin compositions were prepared having the following formulation:

| | Example No. | |
|---|---|---|
| | 29 | 30 |
| Epoxy resin of Examples 1 to 3 | 100 | 100 |
| Diphenyl phthalate | 100 | |
| Zinc octoate | 5 | 5 |
| Isooctyl diphenyl phosphite | 5 | 5 |

These compositions were cured to compatible resins at 150° C. for one hour, and the Shore D hardness then determined. Example 29 gave a Shore D hardness of 75 to 80, and Example 30, a Shore D hardness of from 25 to 40. This shows the effect of the diphenyl phthalate upon the curing of the epoxy resin. It considerably increased the hardness of the composition, showing that it acts as a curing agent in the presence of the zinc octoate and isooctyl diphenyl phosphite, which in this case serve as accelerators.

Examples 31 and 32

Compositions were prepared, containing 100 grams of the epoxidized resin of Examples 1 to 3, and the amount of diethylene triamine and phenol ester noted in Table VI was added to each of these compositions. The resins thereupon cured at room temperature to a solid of the hardness given. The hardness values are on the Barcol scale (B values) and on the Shore Durometer D scale (D values). The improvement over the control is evident.

TABLE VI

| | Control | Example No. | |
|---|---|---|---|
| | | 31 | 32 |
| Epoxy resin | 100 | 100 | 100. |
| Diethylene triamine | 11.5 | 11.5 | 11.5. |
| Diphenyl ester of dimerized linoleic acid | | 100 | |
| Triphenyl ester of trimerized linoleic acid | | | 100. |
| Results: | | | |
| Time to tack free at room temp. after addition of diethylene triamine | 26 min | 3 hrs | 2 hrs. |
| Condition of surface | Dry | Dry | Dry. |
| Hardness after 24 hours at room temp | B37-40 [1] / B39-43 [1] | D17-35 [2] / D17-35 [2] | D35-50.[2] / D35-51.[2] |
| Hardness after one week at room temp | B36-39 [1] / B36-40 [1] | D34-50 [2] / D34-50 [2] | D47-61.[2] / D48-61.[2] |
| Impact strength after one week at room temp | 3.76 | 9.37 | 14.19. |

[1] B=Barcol Hardness.
[2] D=Shore D Hardness.

The polyepoxide resin compositions in accordance with the invention, containing the phenol ester, are particularly advantageous because of their long lasting liquid stage, coupled with a sufficiently rapid set at low temperatures to a quite hard composition. They are useful in the preparation of room temperature curing coating compositions, such as paints and varnishes, and they are also useful in the formation of baking enamels and paints. If desired, the compositions can include other film-forming materials and solvents and this is applied to the surface to be coated. The coatings may then be allowed to set at room temperature, or heat may be applied according to the need.

The polyepoxide compositions also are useful in the preparation of large castings and pottings which can be cured at low temperatures without liberation of large amounts of heat, and in this way give a more even cure resulting in a stronger and more durable product. The compositions also are useful in the preparation of laminates according to well known methods, using as the base any suitable material such as glass, cloth, paper, asbestos paper, mica flakes, cotton bats, duck, muslin, canvas and the like. Woven glass cloth that has been given prior treatment with well known finishing or sizing agents can also be used. In this application the sheets of material are impregnated with a mixture of polyepoxide, curing agent and/or accelerator, as desired, and phenol ester. A solvent can be used to supplement the phenol ester in order to obtain a fluid mixture. The impregnated material is brought together with other layers to form the desired laminate, and cured, desirably under pressure, at the desired temperature.

Having regard to the foregoing disclosure, the following is claimed as the inventive and patentable embodiments thereof:

1. In the process for curing a liquid epoxy resin having an epoxy equivalency greater than 1 with an epoxy resin curing agent, the improvement which comprises curing the said epoxy resin in the presence of a phenol ester having at least one phenolic hydroxyl group, the phenolic hydroxyl groups on the phenol being esterified with an organic hydrocarbon carboxylic acid having from one to about twenty-four carbon atoms per carboxylic acid group, the phenol having from one to about thirty carbon atoms per phenolic hydroxyl group.

2. A process in accordance with claim 1 in which the epoxy resin curing agent is an organic anhydride.

3. A process in accordance with claim 1 in which the epoxy resin curing agent is an organic amine.

4. A process in accordance with claim 1 in which the epoxy resin curing agent is a polyvalent metal salt.

5. A process in accordance with claim 1 in which the epoxy resin curing agent is a mixture of an organic anhydride and a polyvalent metal salt.

6. A process in accordance with claim 1 in which the phenol ester is a tallate ester.

7. A process in accordance with claim 1, which comprises curing the said epoxy resin in the presence of the phenol ester, with a polyvalent metal salt as a curing accelerator.

8. A composition for curing liquid epoxy resins having an epoxy equivalency greater than 1, consisting essentially of a phenol ester having at least one phenolic hydroxyl group, the phenolic hydroxyl groups on the phenol being esterified with an organic hydrocarbon carboxylic acid having from one to about twenty-four carbon atoms per carboxylic acid group, the phenol having from one to about thirty carbon atoms per phenolic hydroxyl group, and an epoxy resin curing agent or accelerator other than the phenol ester, the phenol ester and the curing agent or accelerator being present in proportions to effect a cure when mixed with a liquid epoxy resin.

9. A composition in accordance with claim 8 in which the curing agent is an organic anhydride.

10. A composition in accordance with claim 8 in which the curing agent is an organic amine.

11. A composition in accordance with claim 8 in which the curing agent or accelerator is a polyvalent metal salt.

12. A composition in accordance with claim 8 in which the phenol ester is a tallate ester.

13. A polymerizable liquid epoxy resin composition ready for curing upon addition of an epoxy resin curing agent or accelerator, comprising a liquid epoxy resin having an epoxy equivalency greater than 1, and a phenol ester having at least one phenolic hydroxyl group, the phenolic hydroxyl groups on the phenol being esterified with an organic hydrocarbon carboxylic acid having from one to about twenty-four carbon atoms per carboxylic acid group, the phenol having from one to about thirty carbon atoms per phenolic hydroxyl group.

14. A heat-polymerizable liquid epoxy resin composition consisting essentially of a liquid epoxy resin having an epoxy equivalency greater than 1, a phenol ester having at least one phenolic hydroxyl group, the phenolic hydroxyl groups on the phenol being esterified with an organic hydrocarbon carboxylic acid having from one to about twenty-four carbon atoms per carboxylic acid group, the phenol having from one to about thirty carbon atoms per phenolic hydroxyl group, and an epoxy resin curing agent or accelerator other than the phenol ester, capable of curing or accelerating the curing of the epoxy resin upon the application of heat.

15. A polymerizable epoxy resin composition in accordance with claim 14, in which the curing agent or accelerator is a polyvalent metal salt.

16. A polymerizable epoxy resin composition in accordance with claim 14, containing in addition an organic phosphite.

17. A resinified epoxy resin product consisting essentially of the reaction product of a liquid epoxy resin having an epoxy equivalency greater than 1, an epoxy resin curing agent or accelerator other than a phenol ester, and a phenol ester having at least one phenolic hydroxyl group, the phenolic hydroxyl groups on the phenol being esterified with an organic hydrocarbon carboxylic acid having from one to about twenty-four carbon atoms per carboxylic acid group, the phenol having from one to about thirty carbon atoms per phenolic hydroxyl group.

References Cited by the Examiner

UNITED STATES PATENTS

| | | | |
|---|---|---|---|
| 2,972,589 | 2/1961 | Steckler | 260—18 |
| 3,032,527 | 5/1962 | Greenlee | 260—18 |

LEON J. BERCOVITZ, *Primary Examiner.*

R. W. GRIFFIN, *Assistant Examiner.*